United States Patent
Madoff et al.

(10) Patent No.: US 8,024,254 B2
(45) Date of Patent: Sep. 20, 2011

(54) OPENING PRICE PROCESS FOR TRADING SYSTEM

(75) Inventors: Peter B. Madoff, Old Westbury, NY (US); Glen R. Shipway, Southbury, CT (US); Andrew S. Margolin, Port Washington, NY (US)

(73) Assignee: Primex Holdings LLC, NY, NY (US)

( * ) Notice: Subject to any disclaimer, the term of this patent is extended or adjusted under 35 U.S.C. 154(b) by 1074 days.

(21) Appl. No.: 11/511,889

(22) Filed: Aug. 29, 2006

(65) Prior Publication Data

US 2007/0043652 A1 Feb. 22, 2007

Related U.S. Application Data

(63) Continuation of application No. 09/392,018, filed on Sep. 8, 1999, now Pat. No. 7,099,839.

(51) Int. Cl.
*G06Q 40/00* (2006.01)
(52) U.S. Cl. ............... 705/37; 705/1; 705/26; 705/36 R
(58) Field of Classification Search ............. 705/1, 26, 705/36 R, 37
See application file for complete search history.

(56) References Cited

U.S. PATENT DOCUMENTS 6,016,483 A * 1/2000 Rickard et al. ............. 705/36 R

OTHER PUBLICATIONS

Brooks, "Instinet Corporation", SEC-No Action Letter, Fed. Sec. L. Rep. P 78,997, 1986 WL 67657, pp. 1-27.
Wunsch, "Arizona Stock Exchange", SEC-No Action Letter, 1997 WL 11862, pp. 1-12.
SEC Release No. 34-36367, "Self-Regulatory Organization: Delta Government Options Corp.; Order Approving Implementation of New Procedures for the Clearance and Settlement of Repurchase Transactions and Reverse Repurchase Transactions", 60 SEC-Docket 1216-2, Oct. 13, 1995.
SEC Release No. 34-27611, "Self-Regulatory Organization: Delta Government Options Corp.; Order Granting Temporary Registration as a Clearing Agency", 45 SEC-Docket 388-263, Jan. 12, 1990.
SEC Release No. 34-28899, "Self-Regulatory Organizations; Wunsch Auction Systems, Inc.; Order Granting Limited Volume Exemption from Registration as an Exchange under Section 5 of the Securities Exchange Act", 48 SEC Docket 402-152, Feb. 20, 1991.
Klein, "B&K Securities, Inc. Inquiry Letter", No-Act, NAFT WSB File No. 042285012, Apr. 16, 1985.
Slevin, "93-94 CCH Dec., FSLR ¶76,837, Cantor Fitzgerald, G.P. Inquiry Letter", No-Act, NAFT WSB File No. 032194021, Oct. 1, 1993.
Olberg, "CapitaLink Securities Corp. Inquiry Letter", No-Act, NAFT WSB File No. 100686002, Sep. 30, 1986.
Olberg, "CapitaLink Securities Corp. Inquiry Letter 1 and Inquiry Letter 2", No-Act NAFT WSB File No. 041690014, Apr. 10, 1990.

(Continued)

*Primary Examiner* — Yogesh C Garg
(74) *Attorney, Agent, or Firm* — Baker & Hostetler LLP

(57) ABSTRACT

A system for determining an opening price for products traded over a distributed, networked computer system is described. The system includes a plurality of workstations for entering orders for financial products into the distributed, networked computer system, said orders specifying a quantity of the financial product. A plurality of workstations for entering orders and a server computer coupled to the workstations, said server computer executing a server process that determines an opening price for the product. The opening price process posting an allocation message to market maker participants to communicate an expected allocation of the imbalance for execution at an initial opening of the market in the event that the imbalance exists at the opening.

8 Claims, 11 Drawing Sheets

OTHER PUBLICATIONS

Fondren, "Intervest Financial Services, Inc. Inquiry Letter", No-Act NAFT WSB File No. 112392013, Nov. 25, 1992.

Branch, "Exchange Services, Inc. Inquiry Letter", No-Act NAFT WSB File No. 081285010, Jun. 22, 1985.

Branch, "91 CCH Dec., FSLR ¶79,804, Exchange Services, Inc. Inquiry Letter", No-Act, NAFT WSB File No. 090991011, Sep. 11, 1991.

Hood, "91-92 CCH Dec., FSLR ¶76,093, Instinet Corp. Inquiry Letter", No-Act, NAFT WSB File No. 120991004, Dec. 6, 1991.

Feller, "91-92 CCH Dec., FSLR ¶76,097, Jefferies & Co., Inc. Inquiry Letter", No-Act, NAFT WSB File No. 010692003, Dec. 31, 1991.

Feller, "93 CCH Dec., FSLR ¶76,718, Lattice Trading, Inc. Inquiry Letter", No-Act, NAFT WSB File No. 091393002, Sep. 10, 1993.

Brooks, "91-92 CCH Dec., FSLR ¶76,092, Fagin, Kopley & Hanson, Inc. Staff Reply Letter", No-Act, NAFT WSB File No. 112591019, Nov. 25, 1991.

Glenn, "Nat'l. Partnership Exchange, Inc. Inquiry Letter", No-Act, NAFT WSB File No. 081886013, Aug. 13, 1986.

Simon, "85-86 CCH Dec., FSLR ¶78,161, Nat'l Partnership Exchange, Inc. Staff Reply Letter", No-Act, NAFT WSB File No. 090985009, Sep. 1, 1985.

Weissler, "New York Securities Auction Corp. Inquiry Letter", No-Act, NAFT WSB File No. 062590005, Jun. 15, 1990.

Feller, "87-88 CCH Dec., FSLR ¶78,515, Jefferies & Co., Inc. Inquiry Letter", No-Act, NAFT, WSB File No. 080387006, Jul. 28, 1987.

McTamaney, "RMJ Securities Corp. Inquiry Letter", No-Act, NAFT WSB File No. 011789008, Jan. 12, 1989.

Roiter, "Security Pacific Nat'l. Bank Inquiry Letter", No-Act, NAFT WSB File No. 081985007, Aug. 18, 1985.

Roiter, "Security Pacific Nat'l. Bank Inquiry Letter", No-Act, NAFT WSB File No. 082586014, Aug. 19, 1986.

Tario et al., "Transaction Services Inquiry Letter and Staff Reply Letter", No-Act, NAFT WSB File No. 061785011, Jun. 15, 1985.

Hewitt, "Troster Singer Corp. Inquiry Letter and Staff Reply Letter", No-Act, NAFT WSB File No. 081285011, Jun. 23, 1985.

United States Securities and Exchange Commission, Division of Market Regulation, "Market 2000: An Examination of Current Equity Market Developments—Appendix IV: Description of Proprietary Trading Systems", Jan. 1994.

* cited by examiner

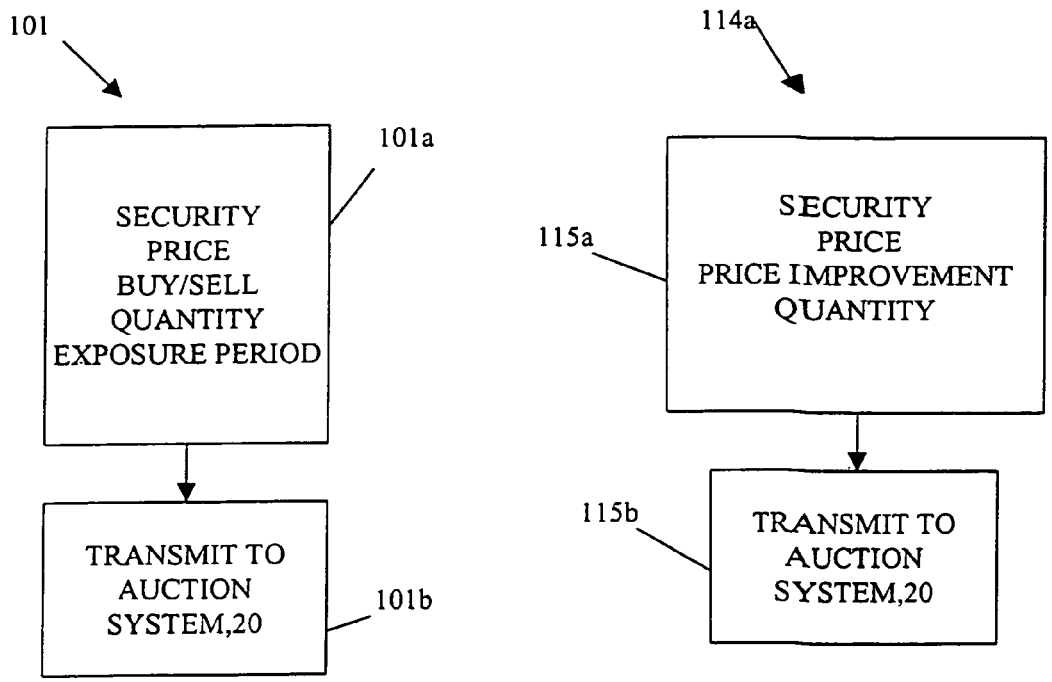
FIG. 2A
FIG. 2B
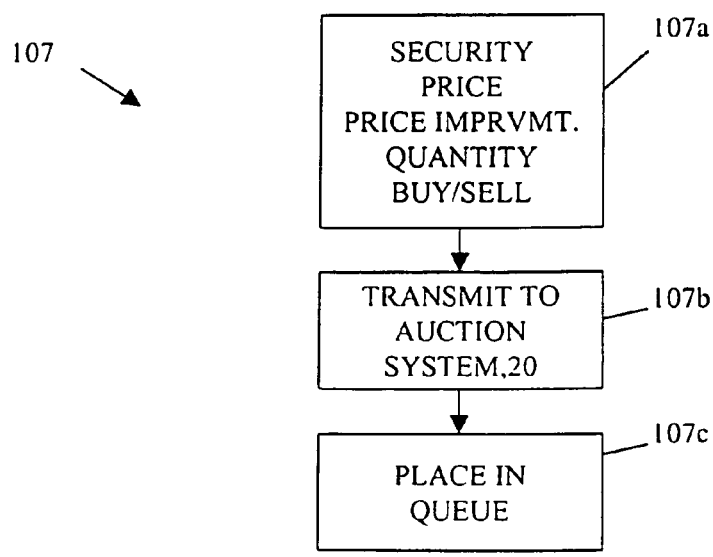
FIG. 2C

FIG. 6A

| Time (A.M.) | Event or Rule | Individual Market Makers Anticipated Share Allocation Message |
|---|---|---|
| 6:00 | System opens to receive market orders (customer orders only) | |
| .. .. .. .. | | |
| 9:00 | | |
| 9:01 | | |
| 9:02 | | |
| 9:03 | | |
| 9:04 | 1st public dissemination of current balance | |
| 9:05 | | ASAM Update |
| 9:06 | | |
| 9:07 | | |
| 9:08 | | |
| 9:09 | | ASAM Update |
| 9:10 | | |
| 9:11 | | |
| 9:12 | | |
| 9:13 | | ASAM Update |

FIG. 6B

| Time | Event |
|---|---|
| 9:14 | |
| 9:15 | 2nd public dissemination of current balance — ASAM Update |
| 9:16 | |
| 9:17 | |
| 9:18 | |
| 9:19 | |
| 9:20 | 3rd public dissemination of current balance — ASAM Update |
| 9:21 | ASAM Update |
| 9:22 | ASAM Update |
| 9:23 | ASAM Update |
| 9:24 | ASAM Update |

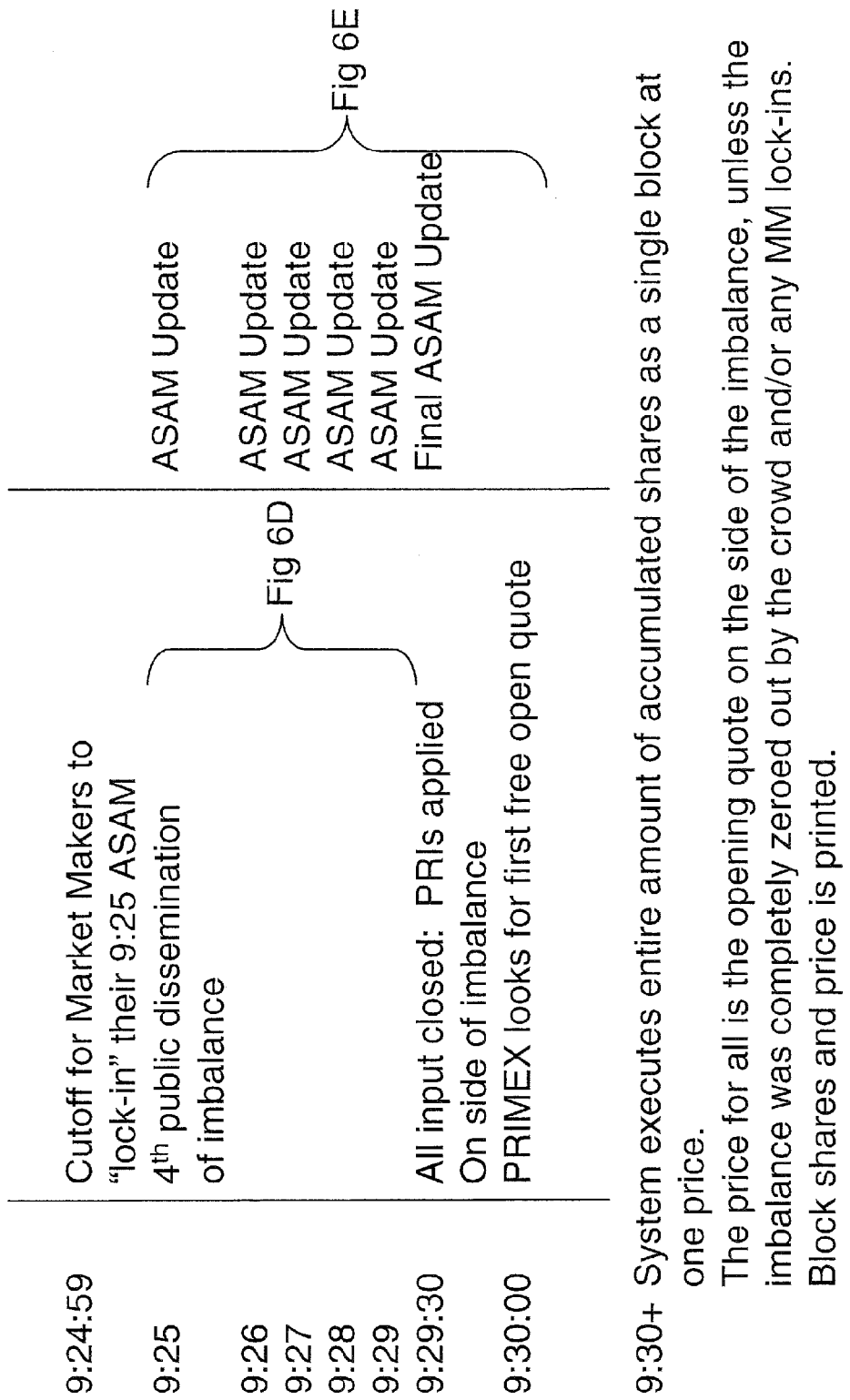

FIG. 6D

- No cancellations of standing orders
- No new orders except those that would <u>reduce</u> any portion of imbalance not locked-in by MMS
- Proprietary orders by BDs ok.
- If post-locked-in imbalance goes to zero, this is announced and additional orders seeking to reduce imbalance will be rejected.

FIG. 6E

The ASAM will be static here for those MMs who chose to Lock-in as of 9:24:59

US 8,024,254 B2

OPENING PRICE PROCESS FOR TRADING SYSTEM

This application is a continuation (and claims the benefit of priority under 35 USC 120) of U.S. application Ser. No. 09/392,018, filed Sep. 8, 1999. The disclosure of the prior application is considered part of (and is incorporated by reference in) the disclosure of this application.

BACKGROUND

This invention relates to determining an opening price in an automated trading system for trading products such as equity securities.

In any trading system or market, there exists the possibility that at the opening of trading, the volume of buy orders will not balance the volume of sell orders. This could occur for many reasons or for no apparent reason. For example, events may trigger buying or selling pressure in a particular security or the market in general. Also simple fluctuations in supply/demand could produce an imbalance at the opening.

SUMMARY

According to an aspect of the invention, a method of determining an opening price for a product traded in a trading system, includes receiving orders for the product, each order specifying a quantity and whether the order is a buy or sell order, determining an imbalance condition between received buy orders and received sell orders for the product and posting an allocation message to market maker participants to communicate an expected allocation of the imbalance for execution at an initial opening of the market in the event that the imbalance exists at the opening.

According to an additional aspect of the invention, a computer program product for determining an opening price for a product resides on a computer readable medium. The computer program includes instructions for causing a computer to receive orders for a product, each order specifying a quantity and whether the order is a buy or sell order at a market price, determine an imbalance condition between received buy orders and received sell orders, and post an allocation message to market maker participants to communicate an expected allocation of an imbalance for execution at an initial opening of the market in the event that the imbalance exists at the opening.

According to an additional aspect of the invention, a system for determining an opening price for products traded over a distributed, networked computer system includes a plurality of workstations for entering orders for financial products the orders specifying a quantity of the financial product. The system including a server computer coupled to the workstations. The server computer executing a server process that determines an opening price for the product, the server process comprising instructions that cause the server to receive orders for the product, each order specifying a quantity and whether the order is a buy or sell order at a market price, determine an imbalance condition between received buy orders and received sell orders and post an allocation message to market maker participants to communicate an expected allocation of the imbalance for execution at an initial opening of the market in the event that the imbalance exists at the opening.

One or more of the following advantages may be provided by aspects of the invention. The opening price process provides more transparency to the forces that impact price at the opening by disseminating Imbalance Messages and Anticipated Share Allocation Messages to the public and market participants, respectively, which assist in reducing potential for excess volatility and help bring a market to an equilibrium price more smoothly as a market opening approaches. This process thus provides several advantages for investors and other participants. It results in a single price for all who participate at the open and the price that is provided is rationally related to market forces that may exist at that point in time since the price itself can be based on the opening quote on the side of the imbalance, or alternatively, at the midpoint of the opening quote. The price "on the side of the imbalance" is a price which is at the offer price if there is a buy-side imbalance or a bid price if there is a sell-side imbalance. Thus, the process provides a price that is fair for all participants and is an efficient mechanism for bringing together buyers and sellers. The process removes currently existing execution price variations owing to where and when orders are sent while it mutualizes any imbalances amongst various market makers. The process facilitates the primary market quotation finding an equilibrium and expands the liquidity pool by drawing on different sources of available capital, which includes orders as well as the capital that dealers in the market are willing to provide. The process can be used with other markets or exchange mechanisms other than an auction system. For example, it can be used where prices are electronically calculated and orders are electronically matched or crossed.

BRIEF DESCRIPTION OF THE DRAWINGS

FIGS. 2A-2C show entry formats for orders, responses and pre-defined relative indications.

FIGS. 6A-6E is a flow chart showing a time line of events that occur in an embodiment of the opening of FIGS. 3A-3B.

DESCRIPTION

Figure 1:
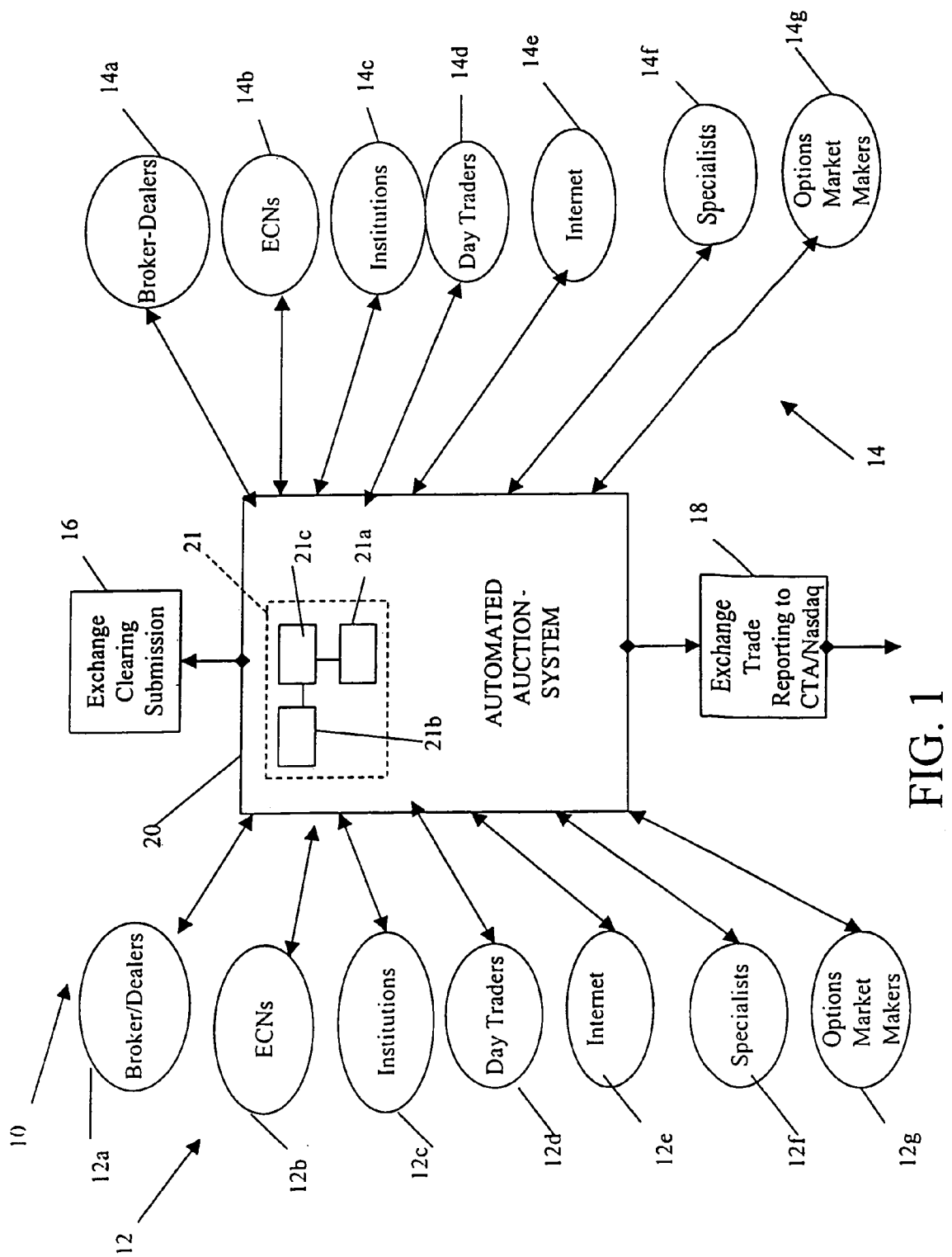
FIG. 1 is a block diagram of an auction system.

Referring now to FIG. 1, a networked auction system 10 designed to facilitate trading of products such as real property, personal property, and financial property such as equity securities and/or other financial instruments such as bonds, options, futures, and so forth is shown. The networked auction system 10 will be described in terms of a system and process in which financial instruments such as stocks are auctioned. Any product could be auctioned particularly if the product has a value or price that can vary over short periods of time.

The networked auction system 10 includes an order entry side 12 comprised of any/all of broker/dealer systems 12a, electronic communication network (ECN) systems 12b and public participant systems 12c that enable members of the public to participate in the networked auction system 10 either directly, via a network, or indirectly, via the Internet or another communication medium, through a sponsor such as a broker/dealer. Each of the systems 12 allow the various participants to enter orders into an automated auction system 20. The order entry portion 12 of the networked auction system 10 can also include day trader systems 12d, institutional systems 12e, exchange specialists 12f, and options market makers 12g.

The networked auction system 10 also includes an order response side 14. The order response side 14 can include the same participants including broker/dealer systems 14a, ECN systems 14b Internet based participant systems 14c, either direct or sponsored, day trader systems 14d and institutional systems 14e and exchange specialists 14f, and options market makers 14g. The responders can use the same physical system as is used to enter orders except the responders would use an order response process. These systems 14 may be referred to herein as the "crowd." With these order response systems 14, when an order is presented, via the order entry systems 12a-12g, any one or more of the order response systems 14a-14g can respond to the order. Whichever order response system 14 responds first to the order and meets or exceeds the terms of the order will result in a match for execution. The response systems 14a-14g can also have an entry flow of pre-defined relative indications (described below) that express a participant's willingness to trade. Each of the order entry systems 12a-12g and order response systems 14a-14g are representative of types of trader-systems and, in fact, in any practical example of such a system, there could be many hundreds, thousands, etc. of any one type or other types of order entry and order response systems.

The order entry systems 12 or the order response systems 14 can be workstations. The workstations can have an interface to communicate with the automated auction system 20. Alternatively, the workstations can have an application program interface that is developed to interface with the automated auction system 20, or the Financial Information Exchange protocol customized to the auction system 20.

The automated auction system 20 includes at least one server system 21 including a process 21a that is coupled to the order systems 12 and response systems 14 via a network (not shown) parts of which can be proprietary networks and parts of which can be the Internet. The server system 21 executes a server process 50 that is stored on a storage medium 21b and which is executed in computer main memory 21c that is part of the server 21. The auction system 20 also is coupled to an exchange clearing submission system 16 and an exchange trade reporting system 18. The automated auction system 20 submits exchange clearing submissions to the clearing system 16 and reports execution of trades to the reporting system 18. Trade reporting is accomplished for every execution, (e.g. within 90 seconds of the execution of the trade), so that the trade can be reported for dissemination to vendors of market news, i.e., financial information, distributors, news outlets, and so forth. The reporting system 18 is a Securities and Exchange Commission (SEC) or other regulatory approved or authorized process through which all trade reports in public securities are disseminated, i.e., the Consolidated Tape Association (CTA) for exchange-listed stocks, and through the NASD/Nasdaq for Nasdaq-listed stocks.

The automated auction system 20 can be a facility of a stock exchange, a market or a self regulatory organization (SRO). As a facility of an SRO which may include an exchange or market, every trade that is executed in the automated auction system 20 is given to the SRO so that the SRO can report the trade and perform other regulatory and clerical operations.

The automated auction system 20 matches orders with responses, other orders, and pre-defined relative indications of a willingness to trade. Once an order is matched to a response, another order, or pre-defined relative indication, the match is considered a preliminary execution in the automated auction system 20. The preliminary execution is given to the market or exchange, as appropriate, so that the preliminary execution can be validated. If the preliminary execution is a good execution, it is validated and forwarded to a clearing corporation for clearance and settlement. For example, the exchange can validate that it is a good execution, consistent with the rules of the SRO and the Securities Exchange Commission (SEC) or equivalent regulatory authority and that there are no existing orders that could have been executed or that none of the parties are suspended from trading, and so forth. The exchange trade clearing 16 and reporting 18 are, in general, conventional, the manner that the automated auction system 20 would interface to the exchange trade clearing 16 and reporting 18 could be specified by the those systems.

Each order in the automated auction system 20 has a life span. The maximum life span of an order is determined by the order entry side 14 of the auction 10. The life span can be variable and can be any set time period. Fixed time periods are preferred for trading financial securities such as stocks. Exemplary fixed time periods are a 15 second order, a 30 second order or a 0 second order. The fixed time periods can be chosen taking into consideration the nature of the product that is being traded, any regulatory rules that are imposed on trading the product, as well as, the nature of the market activity. For a financial instrument such as stocks, regulatory rules are generally very important in determining time periods. Other times may be used even for financial instruments based on changes in regulatory rules. At the instant of order entry, an order is exposed to the crowd for the exposure time specified in the order. However, an execution can always end the auction sooner, as will be described below.

Aspects of the auction system 20 rely upon relative prices. These prices are relative to a standard, variable market price. One standard pricing mechanism used in the auction system 10 when auctioning stocks is The National Best Bid/offer (NBBO). The NBBO is a standardized quote in the securities industry for the national market systems best consolidated quotation. The National Best Bid/Offer is a quantifiable price to buy and sell. The NBBO is always changing and could change during the life of an order having an impact on the final price.

The process can incorporate a relative pricing mechanism referred to as a Predefined Relative Indication (PRI), as described in co-pending U.S. patent application Ser. No. 09/272,542 filed Mar. 19, 1999, entitled "Auction Market With Price Improvement Mechanism", by Peter B. Madoff et al., and assigned to the assignee of the present invention and incorporated herein by reference. A PRI uses the NBBO and a price improvement "pi" to produce relative prices. The PRI enables an order to achieve the best price in the market at the current time. The provision of the price improvement relative to the NBBO or other standard market quote would tend to improve the execution price relative to the spread, i.e., the difference between bid and offer prices for any product or security. It also facilitates decimal denominated trading by enabling small price improvements of one (1) cent or evenless. Auction examples as well as an example of a preferred auction system are described in the above mentioned application Responses in the auction system 20 can include fixed price, relative price and predefined relative indications. Responses can have a life span, but preferably responses have no life span. That is, they are either immediately matched or canceled. The responses can be permitted to choose what types of orders they respond to. For example, participants can respond to either or both of two broad types of orders, public agency orders, e.g., a retail customer, or institutional customer. The second type is professional orders, e.g., professional traders or broker dealers trading for their own account.

A participant may enter pre-defined relative indications at any time during the day. During the day, depending-on market activity, the participant may have a remaining pre-defined relative indication for future auctions. The remaining pre-defined relative indication will still be available for future auctions until the auction parameters that are set for all pre-defined relative indications are exhausted. Two auction parameters are used to manage exposure, but may also have the effect of governing the relative position of the pre-defined relative indications after exhaustion of one of the parameters, and can completely exhaust the predefined relative indication for the other parameter. These parameters are used to give a participant an ability to manage financial exposure. These parameters also guarantee that no one participant or indication would maintain preferential position in the auction. One parameter is a maximum share amount per indication and the other is a maximum share amount per auction.

If a participant has not exceeded the maximum share amount per auction it can in a current auction in which case its pre-defined relative indication retains its time priority and therefore can match with another order. If the maximum share amount per auction for a participant's pre-defined relative indication had been exhausted, then that pre-defined relative indication maintains its price priority, but is lowered in time priority to the end of a queue for that price grouping. If the maximum share amount per indication has been exhausted, then the pre-defined relative indication is extinguished completely.

A pre-defined relative indication, therefore, is a willingness or an expression to trade that resides in the system and remains dormant and unknown by other participants. This mechanism also allows trading interest to remain anonymous as to price, size and identity. A pre-defined relative indication, when activated, becomes a response that is priced relative to the National Best Bid/offer (NBBO). The automated auction system 20 will forward the executions to the exchange for validation, trade reporting and clearance.

Referring now to FIG. 2A, an exemplary format for an order entry 101 for the auction system 10 is shown. The order entry 101 includes information 101*a* entered by the order entry side of the auction. The information can include a security symbol, an indication of whether the order is to buy or sell, a quantity, an exposure period, and price, either fixed, market or with conditions such as a requirement for price improvement relative to the NBBO, or other conditions such as all or none etc. The order entry 101 is transmitted 101*b* to the auction system 20. Orders with a fixed price may be treated differently (executed immediately i.e., a zero second order or canceled) depending on regulatory requirements.

Referring now to FIG. 2B, a format for a response 114 is also shown. The response 113 includes information 115*a* including a security symbol, a price or a price improvement, a quantity of shares and a buy/sell indication. The response information 115*a* is also transmitted 115*b* to the auction system 20 and is placed in a queue (not shown).

Referring now to FIG. 2C, a format for a pre-defined relative indication 107 is shown to include an information portion 107*a* which includes a security symbol, a relative price improvement, a quantity and an indication type, either buy or sell. The information 107*a* is also transmitted 107*b* to the auction system 20. In the auction system 20 the pre-defined relative indication is sorted 107*c* by type, e.g., buy or sell and by price and time received.

Opening Price Process

Figure 3A:
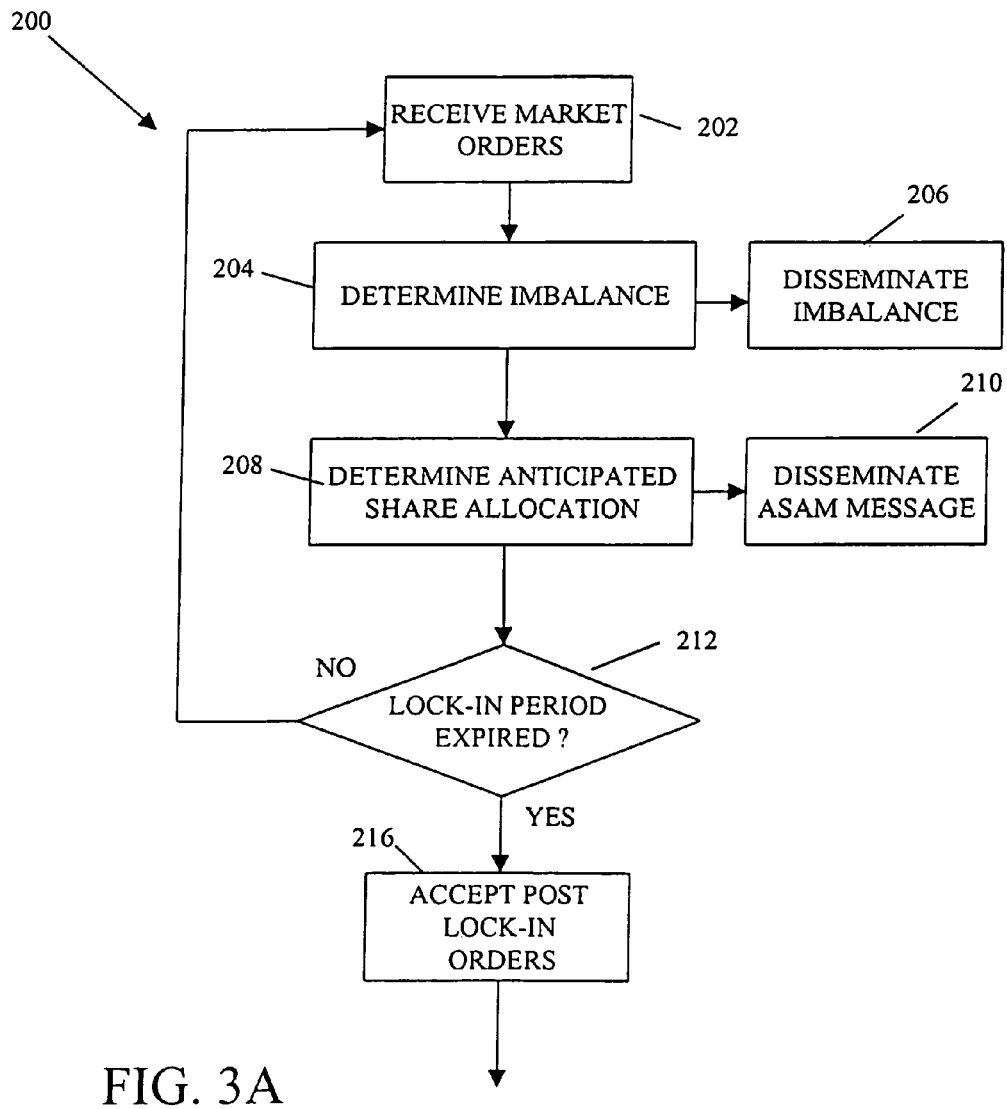
FIGS. 3A-3B are flow charts of an opening price process used in the system of FIG. 1.
Figure 3B:
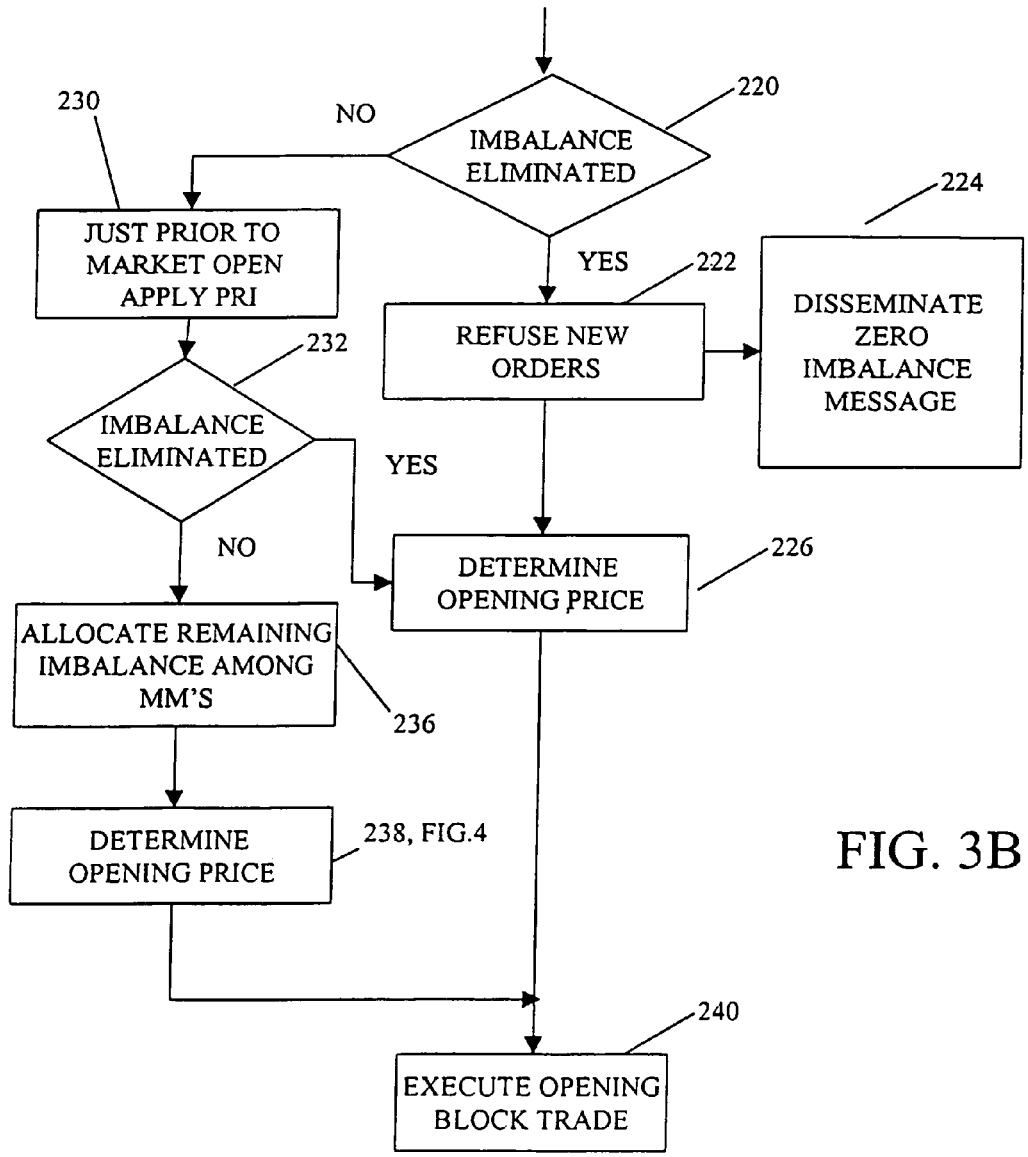

Referring now to FIGS. 3A and 3B, a process 200 for determining an opening price for a product such as a security is shown. The process 200 can be used in any automated trading system that receives orders and responses prior to the opening of trading for the day. The process 200 will be described with respect to the auction system 20 of FIG. 1.

The opening price process 200 receives market orders 202 and determines 204 from the received market orders-whether there is an imbalance. Prior to the auction open, the auction system 20 receives market orders only from auction market makers and crowd participants that are entering their respective customer orders including customer orders for another broker/dealer acting as an agent. As these orders are received 202, the process determines whether there is an imbalance that exists between the two sides of the orders, i.e., buy orders vs. sell orders. If an imbalance exists, the existence of this imbalance is disseminated 206 to all auction participants and the public generally, via an "Imbalance Message." The Imbalance Message includes the size of the total imbalance for a security at that time.

In one embodiment of the invention, broker/dealers, market makers trading for their own account, do not participate, by submitting their own proprietary orders, in the opening price process 200 until just before the actual opening, as will be described below. According to this embodiment the participation of proprietary orders is limited to reducing any potential imbalances that exist just prior to the opening. This limitation is desirable in order to avoid requiring a market maker or broker dealer to satisfy a competitor's proprietary orders.

After any imbalance has been determined 204, the opening price process 200 determines 208 an anticipated share allocation and transmits 210 a "Anticipated Share Allocation Message" (ASAM) to each one of the market makers. In one embodiment, each market maker receives its own different ASAM. The anticipated share allocation represents a quantity of shares that a particular market maker may expect to be allocated for execution at the opening of the auction process 20. The number of shares is based on the size of the imbalance that exists at the time the "Anticipated Share Allocation message" is sent. The share allocation is derived by dividing the imbalance that exists at that point on a pro-rata basis based on each market maker's gross contribution, that is, both buy and sell sides of the market, as a percentage of the sum of the gross contributions of all market makers at the opening.

Market makers are free to act to adjust their quotes and effect trades prior to the opening consistent with applicable rules of that market to establish a position or hedge a risk. Thus, the opening price process 200 issues "Imbalance Messages" and "Anticipated Share Allocation Messages" that assist in reducing potential for excess volatility. These messages can help bring a market to an equilibrium price by drawing in contra-site interest as the opening approaches.

The opening price determining process 200 can periodically determine a share imbalance based on received market orders and likewise determine an anticipated share allocation for each individual market maker at various points in time prior to the opening. A preferred chronology of events will be described below in FIG. 6. At some point in time just prior to the opening of the auction market, the process 200 will determine 212 whether a lock-in period has expired. Up to the expiration of a lock-in period, market makers may choose to lock in their last received anticipated share allocation amount, communicated via the "Anticipated Share Allocation Messages," to insure that the amount will not be further reduced. If a market maker does not lock-in the anticipated share allocation amount, the market maker can still be obliged to fill the allocation if no contra-side interest is generated to reduce the order imbalance. The actual share allocation that is locked in is the amount calculated at the end of the lock-in period, which should correspond, as closely as possible, to the ASAM generated contemporaneous with the closing of the lock-in period.

Figure 5:
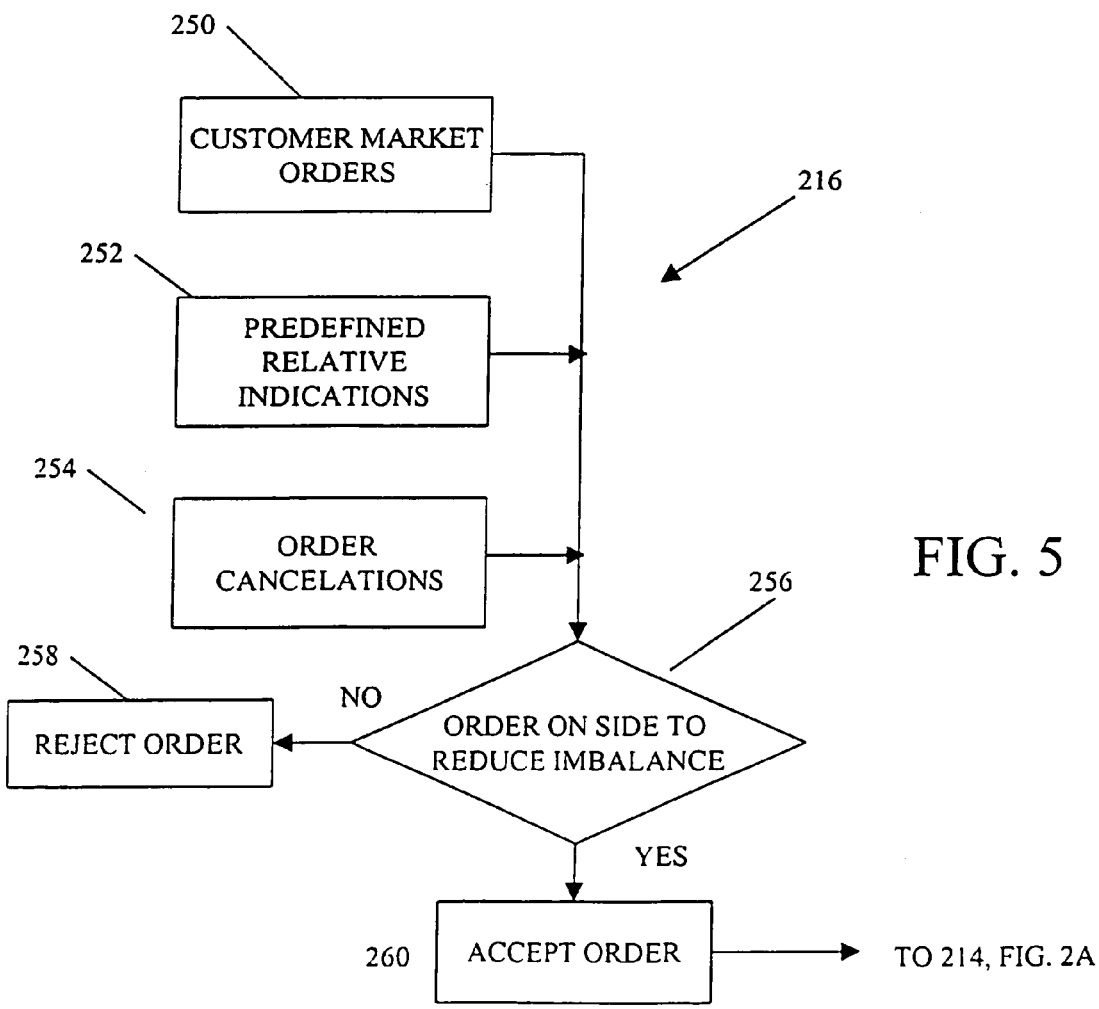

Once the lock-in period has expired, an election to lock in an amount cannot be changed. Subsequent to the expiration of the lock-in period, the opening price process 200 may accept 216 additional orders. This order acceptance process 216, as will be further described in conjunction with FIG. 5, is designed to reduce or eliminate any imbalance that may exist just prior to the opening of the auction. From the period of time subsequent to the lock-in period until the actual start of the post opening auction, the process 200 seeks to reduce the imbalance as much as possible or to otherwise allocate any imbalance to market makers. If, after the expiration of the lock-in period and acceptance of orders, an imbalance is eliminated 220, the process 200 will refuse new orders for participation in the opening 222 and will prevent any additional orders from entering the system until after the market or auction opens for normal daily trading. The opening price process 200 determines the opening price 226 based on the opening quotes in the market and whether the imbalance was eliminated. In the case that the imbalance was reduced to zero, the price for all securities is a single price which is at the midpoint of the opening quote, i.e., the opening NBBO, which represents the highest bid and lowest offer that is not locked or closed (the "first free opening quote").

If the imbalance is not eliminated, as determined at 220, just prior to the market open, embodiments of the opening price process 200 that include predefined relative indications, apply 230 any predefined relative indications that are resident in the auction process 20 that would reduce or eliminate the imbalance. As described above, predefined relative indications have relative prices associated with them during normal market hours. The predefined relative indications are priced at the NBBO plus a price improvement value. For the purposes of the opening, however, the predefined relative indications are treated as market orders on the side that would reduce the imbalance and the specified relative price, e.g., NBBO+pi does not impact the price at the opening or the price at which the predefined relative indication is fulfilled.

Rather, the relative price and price improvement establishes a priority amongst all predefined relative indications as to their participation in the opening process 200 when there is more predefined relative indication interest that is necessary to eliminate the imbalance. Those predefined relative indications that go towards eliminating the balance thus participate in the opening and execute at a price which is the quote on the side of the imbalance.

After all predefined relative indications have been applied to reduce the imbalance, the process 200 determines 232 whether the imbalance has been eliminated. If there is no imbalance remaining, the process 200 determines the opening price 226 based on the side of imbalance existing before the PRIs are applied. If there is an imbalance remaining after PRIs are applied, however, the opening process 200 allocates 236 the remaining imbalance among the market makers. The process 200 will allocate the remaining imbalance amongst the market makers once there is a free opening quote. The remaining imbalance allocated 236 amongst the market makers is allocated pursuant to each market maker's gross pro-rata contribution among all market makers who contribute to the opening. The opening process 200 determines the opening price 238 taking into consideration the imbalance. Thus determining the opening price 238 in the presence of an imbalance, produces a price that is at the opening quote on the side of the imbalance.

Figure 3C:
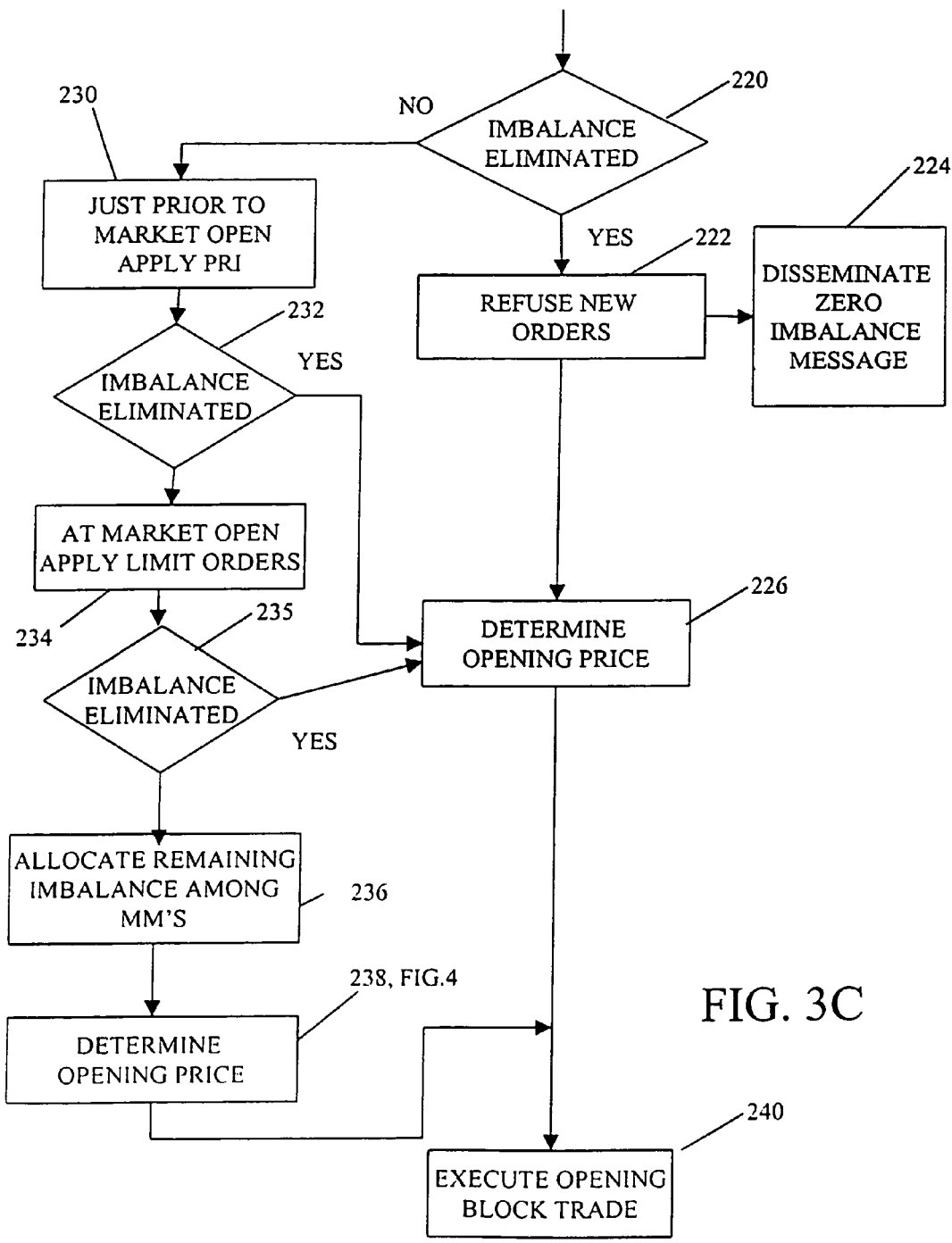
FIG. 3C is a flow chart of an alternative opening price process that can be used in the system of FIG. 1.

Referring to FIG. 3C, an alternative arrangement 221 is possible. This alternative can take into consideration limit orders that are sent to the system 20. That is, the system 20 can also receive limit orders prior to the opening. The alternative arrangement 221 determines if the imbalance was eliminated 220 after expiration of lock in period as in FIG. 3A. If the imbalance was not eliminated, at the market open the process 221 applies predefined relative indications, as above, and determines 232 whether the imbalance has been eliminated. If there is no imbalance remaining, the alternative process 221 determines 226 the opening price based on the side of imbalance existing before the PRIs are applied. If there is an imbalance remaining after PRIs are applied, however, the opening process applies marketable limit orders 234 that are marketable at the opening price. The process 221 determines 235 if the imbalance was eliminated and if so determines 226 the opening price. If there is still an imbalance 239 after applying marketable limit orders, the process 200 allocates 236 the remaining imbalance among the market makers and determines 238 opening price as in FIG. 3B.

Once concluded, the process 200 executes 240 a single block trade that represents all shares that crossed, executed against predefined relative indications, marketable limit orders, or allocated to market makers. The price is the price determined by opening price determining process 226 or 238. Execution reports are generated and can be distributed to each participant and the auction system 20 can disseminate a block print as well as individual trade reports to the tape that make up the opening block print.

Figure 4:
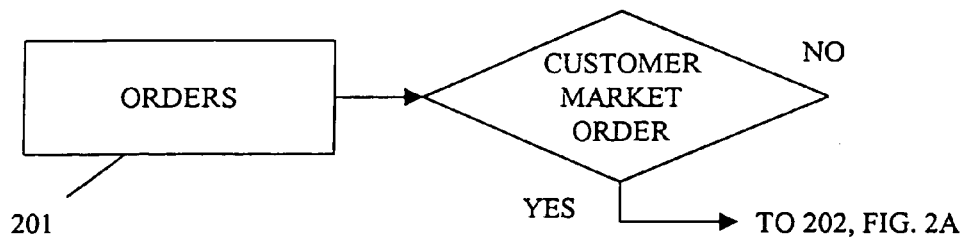
FIGS. 4 and 5 are flow charts showing order acceptance processes useful in the process of FIGS. 3A-3B.

Referring now to FIG. 4, an order acceptance process 201 for the start of the process 200 separates out orders that are received prior to the opening that do not correspond to customer market orders. In one embodiment, the customer market orders are the only orders which initially participate in the opening process. These orders are communicated to the received market order process 202 and the opening price process 200. According to another embodiment, other orders can be accepted including limit orders as mentioned above.

Referring now to FIG. 5, after a lock-in period has expired 212 (FIG. 3A), order acceptance process 216 modifies the types of orders that can be received by the opening price process 200. The order acceptance process 216 accepts only those orders, predefined relative indications and cancellations that minimize an order imbalance including marketable limit orders if the system applies such, and broker-dealer proprietary orders. Thus, the opening price process 200 can receive customer market orders 250, predefined relative indications 252, and order cancellations 254. These orders (or cancellations) are filtered to provide only orders that will reduce a potential imbalance. The accepted orders from process 216 are used in the opening price process 200 (FIGS. 3A, 3B) to reduce the imbalance as described above.

The opening price process 200 can be used in a market such as the auction system mentioned above in order to communicate and equitably allocate any pre-opening imbalance. Pre-opening imbalances can exist for many reasons such as the occurrence of a triggering event or simple normal fluctuations in supply and demand for a particular product such as a security. The process 200 pools at the open all market orders from all participants and publicizes (via the "Imbalance Message") any imbalance that may exist prior to the opening in order to draw in contra-side interest, that is, to draw in orders on the opposite side of the imbalance. The process 200 also allocates remaining imbalance among the market makers for the particular security so that they can be absorbed at an equilibrium price.

The process 200 frequently calculates and delivers to each market maker its respective anticipated share allocation provided by the Anticipated Share Allocation Message (ASAM). This message is different than public postings of total imbalances that all participants see in that the "Anticipated Share Allocation Message" indicates an amount of shares that a particular market maker may be called upon to buy or sell at the opening price established with the first free open quote of the day as discussed above. The market makers have the option up to a point in time just prior to the opening to electronically lock-in their expected allocation. Market makers that do not lock-in may have their allocation reduced to the extent that contra-side interest is drawn in between the lock-in time and the opening of the market or resident predefined relative indications and limit orders are applied to reduce the imbalance. Market makers can use the ASAM to manage risk, adjust quotations and help maintain an orderly market and thus help the market find an equilibrium at the opening.

This process 200 provides several advantages for pricing products such as securities at the opening. The process results in a single price for all participants at the open. The price that is provided is rationally related to market forces that may exist at the time of the opening, since it is based on the opening quote on the side of the imbalance if there is an imbalance or at the midpoint of the opening quote if the pre-opening orders can all be matched. The process 200 provides a price that is fair for all participants who choose to participate while providing an efficient mechanism for bringing together buyers and sellers and facilitating a fair and orderly process of introducing pre-opening orders. The process 200 removes execution price variations based upon where and when orders are sent, while it mutualizes any imbalances amongst various market makers. The process 200 facilitates the primary market quotation helps to find equilibrium for the product and expands the liquidity pool by drawing on the different sources of capital that seek to participate in the opening.

The process 200 when used in the auction system 20 described above leverages the auction business and systems model. The process 200 can be used with other market or exchange mechanisms other than the auction system described above. For example, it can be used with other trading systems where buyers and sellers come together to have their orders electronically executed.

Referring now to FIG. 6, a typical example of a chronology of the opening price process 200 is shown. In this example, the auction market 20 is scheduled to open at 9:30 A.M. and accepts orders starting at 8:00 A.M. The system accepts an order at 8:00 A.M. and continues to receive market orders from customers between 8:00 and 9:00. At 9:00 A.M., the process 200 sends a first public dissemination of current imbalance information, the "Imbalance Message" and also generates and disseminates the first of a set of "Anticipated Share Allocations Message" to individual dealers in the market. Each dealer receives its own anticipated share allocation message and does not see anticipated share allocations of other dealers.

The process 200 at 9:05 A.M., five minutes after the first dissemination of the Anticipated Share Allocation Message sends a second Anticipated Share Allocation Message. The process 200 sends a third Anticipated Share Allocation Message out at 9:10 A.M. At 9:15 A.M., the process 200 sends its second public dissemination of current imbalance position, the "Imbalance Message" and a fourth Anticipated Share Allocation Message. At 9:20 A.M., the process 200 sends its third public dissemination of current imbalance information the, "Imbalance Message" and from 9:20 A.M. to approximately 9:24:59 A.M., the system sends out an Anticipated Share Allocation Message more frequently, e.g., every minute.

At 9:24:59 A.M., the process 200 cuts off a market makers ability to lock in their final share allocation and at 9:25 A.M. the process 200 sends out its fourth and final dissemination of imbalance i.e., the "Imbalance Message." From 9:25 A.M. to 9:29:30 A.M., the process 200 only accepts new orders that would reduce any portion of the imbalance that was not locked in by the market makers including for the first time proprietary orders by brokers-dealers that reduce the imbalance. The process 200 ends if the locked-in imbalance goes to zero any time after 9:25 AM. If the balance is eliminated, any additional orders will be rejected.

The system also continues to disseminate Anticipated Share Allocation Messages at each minute interval. At 9:29:30 A.M., that is 30 seconds before the actual opening, all inputs to the system are closed. Approximately at 9:29:30 any predefined relative indications that exist in the system are applied on the side of the order to reduce any remaining imbalance and in some embodiments marketable limit orders are applied. Thereafter, a final anticipated share allocation update is sent out if there is still an imbalance remaining that must be allocated among market maker participants.

At 9:30 A.M., the auction system 20 or market opens seeking its first free open quote. At sometime after the opening at 9:30+ A.M., the auction system 20 executes the entire amount of accumulated shares as a single block at one price. The price for all the shares is determined on the opening quote on the side of the imbalance unless the imbalance was completely negated by the crowd and/or by market maker trading for their own account and/or predefined relative indications that were applied to reduce the imbalance and marketable limit orders that were used. The opening block is executed at a single price and share amount. The block is disseminated to all participants and printed on the public tape. Each participant also receives its execution reports to the extent it or its customers participated in the opening block. At some point, for example, 10:00 AM, half-hour after the opening, the auction system can print to the tape individual trades that comprise the opening block trade.

Figure 7:
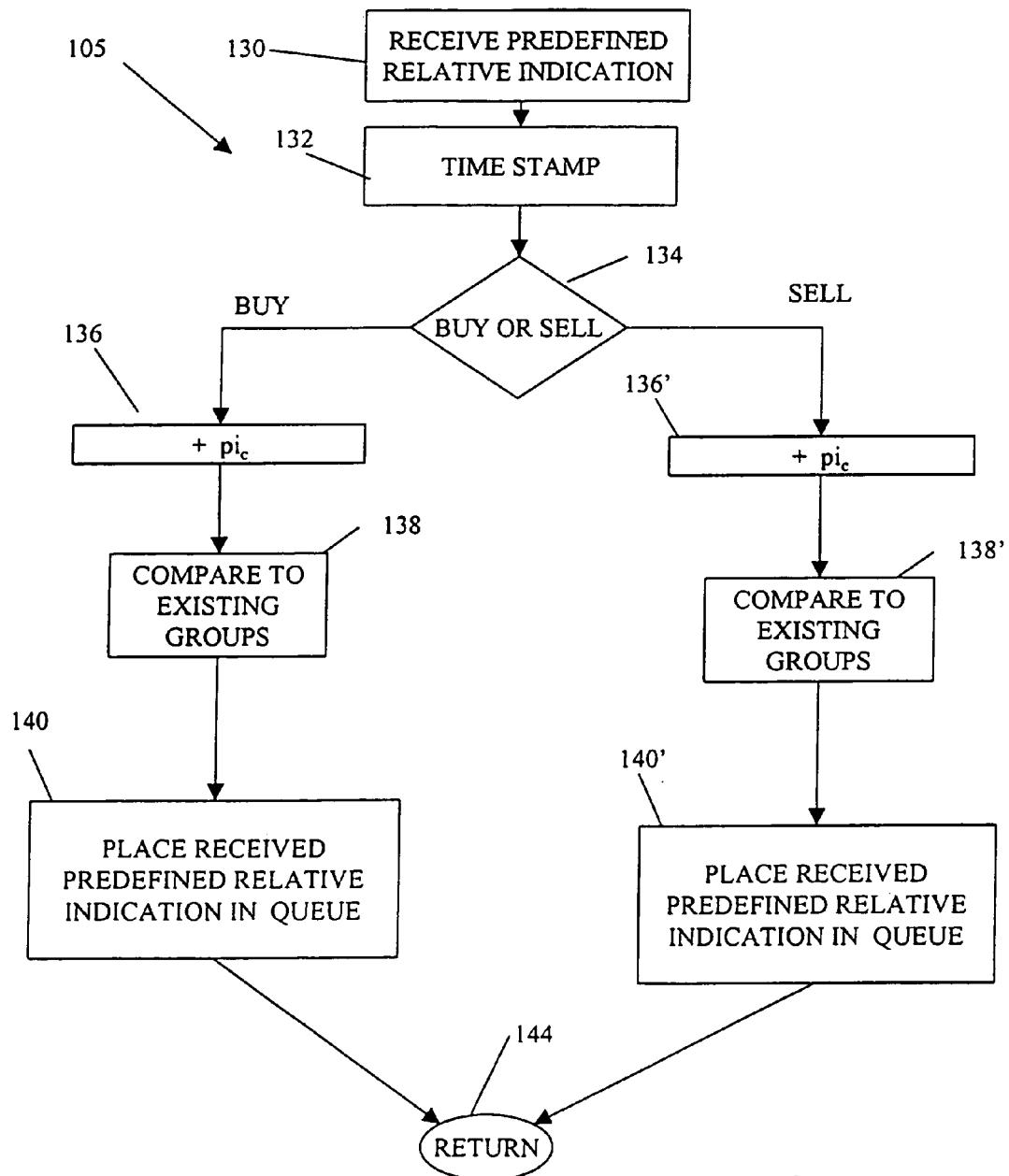
FIG. 7 is a flow chart showing a pre-defined relative indication queue ordering process.

Referring now to FIG. 7, a pre-defined indication ranking process 280 is shown for ranking pre-defined indications by price improvement and time received. The pre-defined indication ranking process 280 receives 282 a pre-defined relative indication and assigns 284 it a time stamp. The process determines 284 whether the pre-defined relative indication is for a buy or a sell. If the pre-defined relative indication is for a buy, the process 280 parses 286 the pre-defined relative indication to extract the price improvement "pi", as specified in the pre-defined relative indication. This price improvement "pi" is compared 288 to previously received price improvements "$pi_p$." The compare process 288 tries to find a previously received price improvement grouping that is equal to, greater than, or less than the current price improvement. If the process 280 finds a price grouping that is equal to a current price improvement "pi" the process 280 places 290 the received pre-defined relative indication at the end of that price improvement grouping. Otherwise, a new grouping at the highest, lowest, or at an intermediate price improvement level is produced for the received pre-defined relative indication.

The process 280 will perform a similar ranking process 280 including comparing 288' and placing the received pre-defined relative indication into a price improvement grouping if the received pre-defined relative indication is determined 284 to be a sell indication. After the process 280 sorts the received pre-defined relative indication, it returns 290. The process can keep track of the pre-defined relative indication by use of a queue (not shown).

In the opening process 200, the price improvement is only used to rank predefined relative indications for participation in reducing a pre-opening share imbalance.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. For example the auction process can be used with other products such as goods, commodities, works of art, etc. It is especially suitable for items that have a value that can change over time in accordance with fluctuations in market conditions. One particular use is for a system and method to price initial public offerings in stocks and other securities, where there often an imbalance exists.

What is claimed is:

1. A method of determining an opening price for a product traded in a trading system, the method executed over a distributed computer network, said method comprising:
   determining, at a server on the distributed computer network, an opening price and an imbalance condition for the product based on buy and sell orders received prior to an opening of the trading system;
   generating at said server, a plurality of messages based on said imbalance;
   transmitting, by said server, at least one of said messages for receipt by a market maker node; wherein said at least one message indicates an imbalance on the side of the buy orders;
   transmitting, by said server, at least another of said messages for receipt by a market maker node; wherein said at least another message indicates an amount of shares a market maker at said market maker node may be called upon to sell at said opening price;
   receiving at said server, in response to said another message, a lock in from said market maker node indicating an amount of shares the market maker node will sell at the open; and
   determining, by said server that said locked in amount of shares were sold at the opening price.

2. The method according to claim 1 wherein:
   said at least another one of said messages comprises a plurality of allocation messages; and,
   said response received at said server is responsive to at least one of said plurality of allocation messages.

3. The method according to claim 2 wherein at least two of said plurality of allocation messages indicate different amounts of shares said market maker at said market maker node may be called upon to sell at said opening price.

4. A method of determining an opening price for a product traded in a trading system, the method executed over a distributed computer network, said method comprising:
   determining, at a server on the distributed computer network, an opening price and an imbalance condition for the product based on buy and sell orders received prior to an opening of the trading system;
   generating at said server, a plurality of messages based on said imbalance;
   transmitting, by said server, at least one of said messages for receipt by a market maker node; wherein said at least one message indicates an imbalance on the side of the sell orders;
   transmitting, by said server, at least another of said messages for receipt by a market maker node; wherein said at least another message indicates an amount of shares a market maker at said market maker node may be called upon to buy at said opening price;
   receiving at said server, in response to said another message, a lock in from said market maker node indicating an amount of shares the market maker node will buy at the open; and,
   determining, by said server that said locked in amount of shares were bought at the opening price.

5. The method according to claim 4 wherein:
   said at least an other one of said messages comprises a plurality of allocation messages; and,
   said response received at said server is responsive to at least one of said plurality of allocation messages.

6. The method according to claim 5 wherein at least two of said plurality of allocation messages indicate different amounts of shares said market maker at said market maker node may be called upon to buy at said opening price.

7. A method of determining an opening price for a product traded in a trading system, the method executed over a distributed computer network, said method comprising:
   determining, at a server on the distributed computer network, an opening price and an imbalance condition for the product based on buy and sell orders received prior to an opening of the trading system;
   generating at said server, a plurality of messages based on said imbalance;
   transmitting, by said server, at least one of said messages for receipt by a market maker node; wherein said at least one message indicates the imbalance;
   transmitting, by said server, at least another of said messages for receipt by a market maker node; wherein said at least another message indicates an amount of shares a market maker at said market maker node will be called upon to sell at said opening price if said server receives a lock in from said market maker node during a lock in period;
   determining at said server, an expiration of the lock in period;
   generating at said server, a message indicating a block trade was executed at said opening price; wherein said block trade includes shares traded by said market maker and shares traded by other market makers; and,
   wherein said shares traded by said market maker in said block trade are the shares indicated in said allocation message transmitted by said server prior to an end of said lock in period.

8. A method of determining an opening price for a product traded in a trading system, the method executed over a distributed computer network, said method comprising:
   determining, at a server on the distributed computer network, an opening price and an imbalance condition for the product based on buy and sell orders received prior to an opening of the trading system;
   generating at said server, a plurality of messages based on said imbalance;
   transmitting, by said server, at least one of said messages for receipt by a market maker node; wherein said at least one message indicates the imbalance;

transmitting, by said server, at least another of said messages for receipt by a market maker node; wherein said at least another message indicates an amount of shares a market maker at said market maker node will be called upon to sell at said opening price if said server receives a lock in from said market maker node during a lock in period;

determining at said server, an expiration of the lock in period and that said market maker node did not lock in an allocation of shares;

generating at said server, a message indicating a block trade was executed at said opening price; wherein said block trade includes shares traded by said market maker and shares traded by other market makers; and wherein said shares traded by said market maker in said block trade are less than the number of shares indicated in said at least another message.

* * * * *